United States Patent
Ji

(10) Patent No.: US 10,495,906 B2
(45) Date of Patent: Dec. 3, 2019

(54) VIEWING ANGLE CONTROL DEVICE AND DISPLAY APPARATUS

(71) Applicant: BOE TECHNOLOGY GROUP CO., LTD., Beijing (CN)

(72) Inventor: Chunyan Ji, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/576,685

(22) PCT Filed: Jun. 16, 2017

(86) PCT No.: PCT/CN2017/088552
§ 371 (c)(1),
(2) Date: Nov. 22, 2017

(87) PCT Pub. No.: WO2018/001116
PCT Pub. Date: Jan. 4, 2018

(65) Prior Publication Data
US 2019/0113783 A1    Apr. 18, 2019

(30) Foreign Application Priority Data
Jun. 29, 2016 (CN) .......................... 2016 1 0500778

(51) Int. Cl.
*G02F 1/13* (2006.01)
*G02F 1/1335* (2006.01)
*F21V 8/00* (2006.01)

(52) U.S. Cl.
CPC ......... *G02F 1/1323* (2013.01); *G02B 6/0061* (2013.01); *G02F 1/133504* (2013.01);
(Continued)

(58) Field of Classification Search
CPC ............. G02F 1/1323; G02F 1/133504; G02F 1/133602; G02F 2001/133626;
(Continued)

(56) References Cited

U.S. PATENT DOCUMENTS

| 7,502,091 B2 | 3/2009 | Hisatake | |
| 2005/0200781 A1* | 9/2005 | Takatani | G02B 27/2214 349/122 |

(Continued)

FOREIGN PATENT DOCUMENTS

| CN | 105093580 A | 11/2015 |
| JP | 2008300206 A | 12/2008 |

(Continued)

OTHER PUBLICATIONS

International Search Report and Written Opinion in PCT/CN2017/088552 dated Sep. 20, 2017.
Office Action in KR1020187000657 dated May 7, 2019.

*Primary Examiner* — Shan Liu
(74) *Attorney, Agent, or Firm* — Syncoda LLC; Feng Ma

(57) ABSTRACT

A viewing angle control device capable of controlling a viewing angle over a viewing surface is disclosed herein, which includes a transparent substrate and at least one light source. The transparent substrate is disposed over the viewing surface. Each light source is disposed over a side surface of the transparent substrate and is configured to emit a light into the transparent substrate from the side surface upon being turned on. The transparent substrate is provided with a plurality of dots, which are configured to scatter the light from each light source such that the viewing angle over the viewing surface is switched by turning on or off the each light source. A display apparatus including a viewing angle control device is also disclosed, where the transparent sub- (Continued)

strate of the viewing angle control device is disposed over a display surface of a display panel.

15 Claims, 7 Drawing Sheets

(52) U.S. Cl.
CPC ...... *G02F 1/133602* (2013.01); *G02B 6/0036* (2013.01); *G02B 6/0041* (2013.01); *G02B 6/0068* (2013.01); *G02B 6/0073* (2013.01); *G02F 1/133615* (2013.01); *G02F 2001/133626* (2013.01)

(58) Field of Classification Search
CPC ......... G02F 1/133615; G02F 1/133553; G02F 1/13363; G02F 1/1336; G02F 2001/133607; G02F 2001/133616; G02F 1/133606; G02F 1/133308; G02F 2001/133317; G02F 2001/133322; G02B 6/0061; G02B 6/0073; G02B 6/0068; G02B 6/0036; G02B 6/0041; G02B 5/0278; G02B 6/0088; G02B 6/005; G02B 6/0083
USPC .............................................. 349/112, 61–64
See application file for complete search history.

(56) References Cited

U.S. PATENT DOCUMENTS

| | | | |
|---|---|---|---|
| 2007/0008456 A1* | 1/2007 | Lesage | G02B 6/0038 349/62 |
| 2007/0030427 A1 | 2/2007 | Hisatake | |
| 2010/0265435 A1 | 10/2010 | Hwang | |
| 2012/0306861 A1* | 12/2012 | Minami | G02B 27/2214 345/419 |
| 2013/0044511 A1* | 2/2013 | Motooka | G02B 6/0013 362/606 |
| 2013/0201427 A1* | 8/2013 | Chen | G02B 27/2214 349/65 |
| 2014/0043377 A1* | 2/2014 | Tanaka | G02B 6/0053 345/690 |
| 2014/0140094 A1* | 5/2014 | Miyao | G02B 6/0055 362/609 |
| 2014/0368907 A1* | 12/2014 | Minami | G02B 5/0215 359/463 |
| 2017/0176809 A1 | 6/2017 | Mao et al. | |
| 2018/0335655 A1* | 11/2018 | Alkhimenko | G02B 6/0065 |

FOREIGN PATENT DOCUMENTS

| | | |
|---|---|---|
| JP | 2012008700 A | 1/2012 |
| WO | 2015121398 A1 | 8/2015 |

\* cited by examiner

VIEWING ANGLE CONTROL DEVICE AND DISPLAY APPARATUS

CROSS-REFERENCE TO RELATED APPLICATION

The present application claims priority to Chinese Patent Application No. 201610500778.8 filed on Jun. 29, 2016, the disclosure of which is hereby incorporated by reference in its entirety.

TECHNICAL FIELD

The present disclosure is related generally to the field of display technologies, and more specifically to a viewing angle control device and a display apparatus.

BACKGROUND

Leakage of privacy frequently occurs during use of electronic products in public places.

In current anti-peeping technologies, such that those involving the use of polymer membranes with an anti-peeping function, or those involving the use of polarizers capable of changing the angle of the absorption axis combined with compensation films to thereby realize an anti-peeping function.

These anti-peeping technologies, however, can be used only in the anti-peeping mode, and it is difficult to switch between the normal mode and the anti-peeping mode.

SUMMARY

In order to address the issues associated with current anti-peeping technologies, the present disclosure provides a viewing angle control device and a display apparatus.

In a first aspect, a viewing angle control device is disclosed. The viewing angle control device is capable of controlling a viewing angle over a viewing surface.

The viewing angle control device includes a transparent substrate and at least one light source. The transparent substrate is disposed over the viewing surface. Each of the at least one light source is disposed over a side surface of the transparent substrate and is configured to emit a light into the transparent substrate from the side surface upon being turned on.

The transparent substrate is provided with a plurality of dots, which are configured to scatter the light from each light source such that the viewing angle over the viewing surface is switched by turning on or off the each light source.

Herein the viewing surface can be from a display panel, a picture frame, or a window presenting images from an inside, etc. The side surface is referred to as a surface on a lateral side of the transparent substrate, and the lateral side is further referred to as a side perpendicular to a side of the transparent substrate that is substantially parallel to the viewing surface.

In the viewing angle control device, the transparent substrate can contain at least one first region. Each first region corresponds to one light source and is at a side opposing to a side surface of the one light source.

Each first region is provided with a subset of dots, which are substantially a first subset of the plurality of dots. The first subset of the plurality of dots are configured to scatter a light from the corresponding light source such that a scattered light predominantly emits out from the each first region to thereby interfere with side viewing from the side opposing to the side surface of the corresponding light source.

Herein each first region can be an edge region on the transparent substrate that is opposing to a side surface of a corresponding light source, but can also be a region other than the edge region.

In the viewing angle control device, each of the first subset of the plurality of dots in the each first region can be disposed in an interior of the transparent substrate, and can also be disposed on a first surface of the transparent substrate facing to the viewing surface.

According to some embodiments of the viewing angle control device, each first region includes a plurality of sub-regions arranged in parallel strips, and each of the plurality of sub-regions is configured to have a substantially same extending direction as the corresponding side surface of the corresponding light source. The plurality of sub-regions are configured such that a first sub-region contains a higher density of dots than a second sub-region closer to the corresponding light source.

In some embodiments of the viewing angle control device, the first subset of the plurality of dots in each first region are aligned in columns, each having a substantially same extending direction as the corresponding side surface of the corresponding light source.

Herein the first subset of the plurality of dots in the each first region can be configured such that a first column contains a larger number of dots than a second column closer to the one light source.

Alternatively, the first subset of the plurality of dots can be configured such that each column of dots contain an equal number of dots; and a distance between every two adjacent columns of dots reduces with an increasing distance of a center line therebetween from the corresponding side surface.

In any of the embodiments of the viewing angle control device as described above, the first subset of the plurality of dots can be configured such that each column of dots have a substantially identical distance.

According to some embodiments, the transparent substrate can further include a second region, which is surrounded by the at least one first region, and a second subset of the plurality of dots are arranged in the second region and are configured to have a lower density than the first subset of the plurality of dots in each first region.

In some embodiments of the viewing angle control device, for each light source, a corresponding side surface of the transparent substrate is configured to have a shorter distance to the each light source than an orthographic projection of a sideline of the viewing surface closest to the each light source on the transparent substrate.

As such, the viewing angle control device can further include at least one shading portion, which respectively corresponds to the at least one light source. Each shading portion is disposed over a surface of the transparent substrate opposing to the viewing surface, and is in a region between a corresponding side surface of the transparent substrate and an orthographic projection of a sideline of the viewing surface closest to a corresponding light source on the transparent substrate. Each shading portion is configured to block scattered light emitted from the region.

In any of the embodiments of the viewing angle control device as mentioned above, the transparent substrate has a composition of a glass, or a polymer plastic. If the transparent substrate has a composition of a polymer plastic, the polymer plastic can be selected from acrylic or polycarbonate.

In any of the embodiments of the viewing angle control device as mentioned above, each dot is configured to have a size in a range of microns to nanometers.

In the viewing angle control device, the viewing surface can be a display surface of a display panel.

In the viewing angle control device as described above, the at least one light source can be configured to be independent from one another.

The at least one light source in the viewing angle control device as described above can include two light sources, which are respectively disposed over two opposing side surfaces of the transparent substrate. It is noted that the above-mentioned configuration does not impose a limitation to the disclosure, and the viewing angle control device can as well include more than two light sources, each disposed over one side surface of the transparent substrate.

In a second aspect, the present disclosure further provides a display apparatus, which includes a display panel and a viewing angle control device according to any of the above-mentioned embodiments. In the display apparatus, the transparent substrate of the viewing angle control device can be disposed over, and covers, a display surface of the display panel.

According to some embodiments of the display apparatus, the display panel is in a shape of a rectangle, and the viewing angle control device includes two light sources, which are respectively disposed over two opposing side surfaces of the transparent substrate.

Other embodiments may become apparent in view of the following descriptions and the attached drawings.

BRIEF DESCRIPTION OF THE DRAWINGS

To more clearly illustrate some of the embodiments, the following is a brief description of the drawings. The drawings in the following descriptions are only illustrative of some embodiment. For those of ordinary skill in the art, other drawings of other embodiments can become apparent based on these drawings.

DETAILED DESCRIPTION

Figure 1:
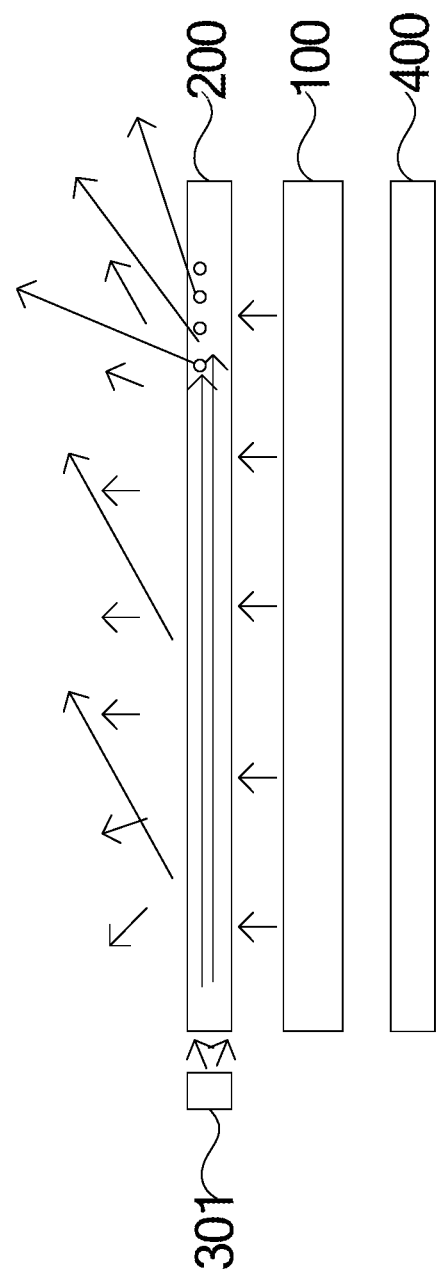
FIG. 1 is a schematic diagram of a display apparatus according to some embodiments of the present disclosure.

In the following, with reference to the drawings of various embodiments disclosed herein, the technical solutions of the embodiments of the disclosure will be described in a clear and fully understandable way.

It is obvious that the described embodiments are merely a portion but not all of the embodiments of the disclosure. Based on the described embodiments of the disclosure, those ordinarily skilled in the art can obtain other embodiment(s), which come(s) within the scope sought for protection by the disclosure.

In order to address the issues associated with current anti-peeping technologies, the present disclosure provides a viewing angle control device.

The viewing angle control device is capable of controlling a viewing angle over a viewing surface, which can be a display panel, a picture frame, or a window presenting images from an inside, etc.

The viewing angle control device includes a transparent substrate and at least one light source. The transparent substrate is disposed over the viewing surface. Each of the at least one light source is disposed over a side surface of the transparent substrate and is configured to emit a light into the transparent substrate from the side surface upon being turned on.

The transparent substrate is provided with a plurality of dots, which are configured to scatter the light from each light source such that the viewing angle over the viewing surface is switched by turning on or off the each light source.

Herein the side surface is referred to as a surface on a lateral side of the transparent substrate, and the lateral side is further referred to as a side perpendicular to a side of the transparent substrate that is substantially parallel to the viewing surface.

In the viewing angle control device as described above, the transparent substrate contains at least one first region, each corresponding to one light source.

For each first region, it is at a side opposing to a side surface of a corresponding light source, and is provided with dots. The dots are substantially a subset of the plurality of dots, and are configured to scatter a light from the corresponding light source such that a scattered light predominantly emits out from the each first region to thereby interfere with side viewing from the side opposing to the side surface of the corresponding light source.

Herein each first region can be an edge region on the transparent substrate that is opposing to a side surface of a corresponding light source, but can also be a region other than the edge region.

In the following, specific embodiments of the viewing angle control device will be illustrated in detail using an example where a display panel is the viewing surface.

As such, the present disclosure provides a display apparatus, which includes a display panel and a viewing angle control device. The viewing angle control device can be based on any one of the embodiments of the viewing angle control device as described above.

Herein the display panel can be an LCD display panel, an OLED display panel, an electrowetting display panel, or of other types of display panels. There are no limitations herein.

Figure 2:
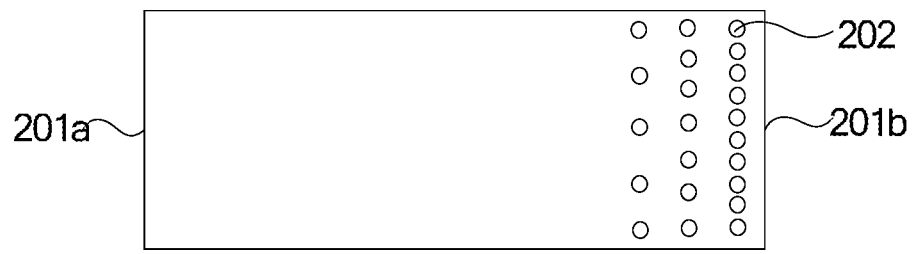
FIG. 2 is a schematic diagram of an arrangement of the dots in the transparent substrate of the display apparatus as shown in FIG. 1 according to some embodiment of the present disclosure.

FIG. 1 and FIG. 2 illustrate a display apparatus according to one embodiment of the present disclosure. As shown in FIG. 1 and FIG. 2, the display apparatus comprises a display panel 100 and a viewing angle control device.

The viewing angle control device comprises a transparent substrate 200 and a first light source 301. The transparent substrate 200 is aligned with, and disposed over a display surface (i.e. light-emitting surface) of, the display panel 100. The first light source 301 is disposed over a first side surface 201a of the transparent substrate 200. A first edge region of the transparent substrate 200 that is apart from the first side surface 201a is provided with a plurality of dots 202, arranged in an interior of the transparent substrate 200, or on a surface of the transparent substrate 200 facing to the display surface of the display panel 100.

In the embodiment of the display apparatus as described above, due to the arrangement of the first light source 301 over the first side surface 201a of the transparent substrate 200 and to the arrangement of the plurality of dots 202 in the first edge region of the transparent substrate 200 that is apart from the first side surface 201a, a light from the first light source 301 can be guided by the plurality of dots 202 in the transparent substrate 200 to emit from the first edge region apart from the first side surface 201a, which is configured to have an emitting angle within a range of angles allowing for side viewing (i.e. a side-viewing range of angles).

As for a side viewer from a side 201b opposing to the first side surface 201a (i.e. the side in the aforementioned edge region of the transparent substrate 200), because of a large amount of light from the first light source 201a seen by the side viewer, the side viewer cannot normally see images displayed by the display panel 100. As such, the purpose for preventing side viewers from peeping from the side 201b that is opposing to the first side surface 201a can be realized, and the display apparatus is in an anti-peeping mode.

If the first light source 301 is turned off, there is no light emitting from the first edge region of the transparent substrate 200 that is apart from the first side surface 201a, a side viewer from the side 201b (which is opposing to the first side surface 201a) can thus normally see images displayed by the display panel 100. As such, the display apparatus is in a non-anti-peeping mode as for the side viewer from the side 201b opposing to the first side surface 201a. In other words, a sider viewer can normally observe the images from the display panel 100 from the side 201b.

Therefore, by turning on or off the first light source, the viewing angle of the display apparatus as described above can be switched between the anti-peeping mode and the non-anti-peeping mode for the display apparatus.

In fact, some light can still emit from an edge region close to the first side surface 201a, as well as from a center region of the transparent substrate 200. The emitting angle of a majority of the light is still within the side-viewing range of angles, and there is only a small amount of light emitting from an angle that is vertical to the transparent substrate 200.

Because the majority of the light emitted from the first edge region close to the first side surface 201a and from the center region enters into the eyes of the side viewer, the side viewer can still normally see the images displayed by the side viewer.

Herein the transparent substrate 200 can have a composition of a glass having a high rate of light transmission, and can also have a composition of a polymer plastics, such as acrylic or polycarbonate, etc. Other compositions are also possible and can be selected depending on practical needs. There are no limitations herein.

In practice, a backlight 400 can be disposed to supply a light source to the display panel 100. There are a variety of manners for arranging the backlight 400, which can be selected depending on practical needs. There are no limitations herein.

In practice, the plurality of dots 202 in the first edge region of the transparent substrate 200 that is apart from the first side surface 201a can have a variety of arrangements. In some embodiments of the present disclosure, the plurality of dots 202 can be aligned in columns, and such an arrangement has advantages such as simple fabrication and easy control over the density of the dots. Other arrangements are also possible and can be selected depending on practical needs. There are no limitations herein.

In practice, if the plurality of dots 202 in the first edge region of the transparent substrate 200 that is apart from the first side surface 201a are aligned in columns, there are multiple arrangement to realize that in the first edge region apart from the first side surface 201a, dots 202 that are closer to the side 201b opposing to the first side surface 201a have a higher density.

Such an arrangement allows as much light from the first light source 301 as possible to emit from the first edge region of the transparent substrate 200 that is apart from the first side surface 201a, which can reduce the influence of the light from the first light source 301 on the front viewers.

FIG. 2 illustrates a first arrangement of the plurality of dots 202 according to some embodiments of the present disclosure. As shown in FIG. 2, as for any two neighboring columns of dots in the first edge region of the transparent substrate 200 that is apart from the first side surface 201a, the column that is farther apart from the first light source 301 contains a larger number of dots 202 than the column that is closer to the first light source 301 (i.e. the column that is closer to the side 201b opposing to the first side surface 201a contains a larger number of dots 201 than the column that is farther apart from the side 201b).

In this embodiment, by arranging that the closer a column is to the side 201b opposing to the first side surface 201a, the larger the number of dots 202 it contains, the dots 202 that are closer to the side 201b opposing to the first side surface 201a are thus configured to have a higher density.

This in turn causes as much light from the first light source 301 as possible can emit from the first edge region of the transparent substrate 200 that is apart from the first side surface 201a.

By controlling the number of dots in each column to thereby control the density of the dots, this embodiment of the display apparatus as described above has advantages such as simple fabrication and easy control over the density of the dots.

Figure 3:
FIG. 3 is a schematic diagram of an arrangement of the dots in the transparent substrate of the display apparatus as shown in FIG. 1 according to another embodiment of the present disclosure.

FIG. 3 illustrates a second arrangement of the plurality of dots 202 according to some other embodiments of the present disclosure. As shown in FIG. 3, as for any three neighboring columns of dots in the first edge region of the transparent substrate 200 that is apart from the first side surface 201a, the distance between the middle column and the column that is farther apart from the first light source 301 is smaller than the distance between the middle column and the column that is closer to the first light source 301.

In this embodiment, by arranging that the closer the columns of dots are to the side 201b opposing to the first side surface 201a, the smaller the distance between columns, the dots 202 that are closer to the side 201b opposing to the first side surface 201a are thus configured to have a higher density. This in turn causes as much light from the first light source 301 as possible can emit from the first edge region of the transparent substrate 200 that is apart from the first side surface 201a.

By controlling the distances between columns to thereby control the density of the dots, this embodiment of the display apparatus as described above has advantages such as simple fabrication and easy control over the density of the dots.

In practice, the first arrangement and the second arrangement as described above can be applied at the same time to thereby configure that the dots 202 that are closer to the side 201b opposing to the first side surface 201a have a higher density.

In order to ensure a consistent brightness along an extending direction of the first side surface 201a in the first edge region of the transparent substrate 200 that is apart from the first side surface 201a, it can be configured such that the dots 202 in each column in the first edge region have a substantially identical distance between every two neighboring dots 202.

The following is noted. Besides the first arrangement and the second arrangement as described above which are both based on a manner of arrangement having the dots 202 aligned in columns, there are other manners of arrangement whereby the dots 202 that are closer to the side 201b opposing to the first side surface 201a have a higher density.

As a general arrangement to this purpose, the first edge region of the transparent substrate 200 that is apart from the first side surface 201a can be configured to comprise a plurality of strip sub-regions, each having a same extending direction as the first side surface 201a. As for every two neighboring strip sub-regions (i.e. a first strip sub-region and a second strip sub-region), the first strip sub-region farther apart from the first light source 301 is configured to contain a larger number of dots 202 than the second strip sub-region that is closer to the first light source 301.

Figure 4:
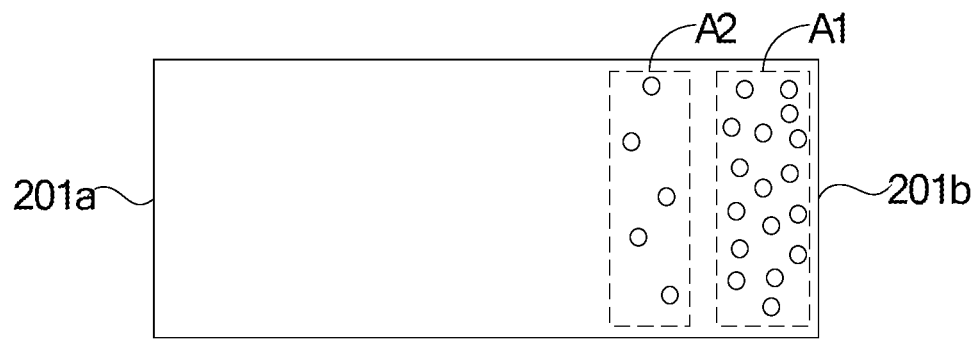
FIG. 4 is a schematic diagram of an arrangement of the dots in the transparent substrate of the display apparatus as shown in FIG. 1 according to yet another embodiment of the present disclosure.

This is illustrated by FIG. 4, where the strip sub-region A1 is farther apart from the first light source 301 than the strip sub-region A2, and the dots 202 in the strip sub-region A1 have a higher density than those in the strip sub-region A2.

According to some embodiment of the present disclosure, in order to extend the anti-peeping function of the display apparatus to further prevent a side viewer on the first side surface 201a from normally seeing the images displayed by the display panel, the viewing angle control device can further comprise a second light source 302, disposed over the second side surface 201b of the transparent substrate 200.

Herein the second side surface 201b is opposing to the first side surface 201a, and similarly to the first edge region of the transparent substrate 200 that is apart from the first side surface 201a, a second edge region of the transparent substrate 200 that is apart from the second side surface 201b is also provided with a plurality of dots 202, similarly arranged in an interior of the transparent substrate 200, or on a surface of the transparent substrate 200 facing to the display surface of the display panel 100.

In this embodiment of the display apparatus as described above, due to the arrangement of the second light source 302 over the second side surface 201a of the transparent substrate 200 and to the arrangement of the plurality of dots 202 in the second edge region of the transparent substrate 200 that is apart from the second side surface 201b, light from the second light source 301 can be guided by the plurality of dots 202 in the transparent substrate 200 to emit from the second edge region apart from the second side surface 201b, which can be configured to have an emitting angle within a range of angles allowing for side viewing (i.e. a side-viewing range of angles).

As for a side viewer from the first side surface 201a, because of a large amount of light from the second light source 201a seen by the side viewer, the side viewer cannot normally see the images displayed by the display panel 100. As such, the purpose for preventing side viewers from peeping from the first side surface 201a can thereby be realized, and the display apparatus is in an anti-peeping mode.

If the second light source 302 is turned off, there is no light emitting from the second edge region of the transparent substrate 200 that is apart from the second side surface 201b, a side viewer from the first side surface 201a can thus normally see the images displayed by the display panel 100. As such, the display apparatus is in a non-anti-peeping mode as for the side viewer from the first side surface 201a.

Therefore, by turning on or off the second light source, the viewing angle of the display apparatus as described above can be switched between the anti-peeping mode and the non-anti-peeping mode for the display apparatus.

Figure 5:
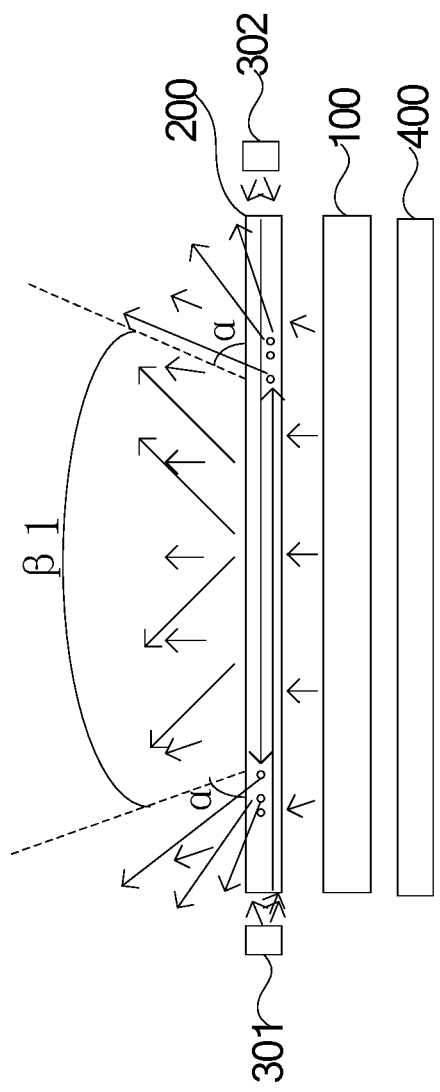
FIG. 5 is a schematic diagram of a display apparatus according to some other embodiments of the present disclosure.

In practice, the first light source 301 and the second light source 302 can be turned on at the same time, as shown in FIG. 5. The light from the first light source 301 emits within a side viewing angle α in a region close to the second side surface 201b, and the light from the second light source 302 emits within the side viewing angle α of a region close to the first side surface 201a.

There is also light emitting in the center region of the transparent substrate 200, and because the majority of the light also emit within the side viewing angle α, there is only a small amount of light emitting in the center region that is perpendicular to the transparent substrate 200, and as such, the majority of the light emitting from the center region substantially enter into the eyes of the side viewer, and the front viewer can still normally see the images displayed in the display panel 100.

The light from the display panel 100 can emit both within the side viewing angle α on each of the two sides and within the front viewing angle β1, due to intervention or interference of the large amount of light from the first light source 301 and/or the second light source 302, the side viewers are thus not able to normally see the light from the display panel 100. As such, the viewing range of the display apparatus is substantially 131.

Figure 6:
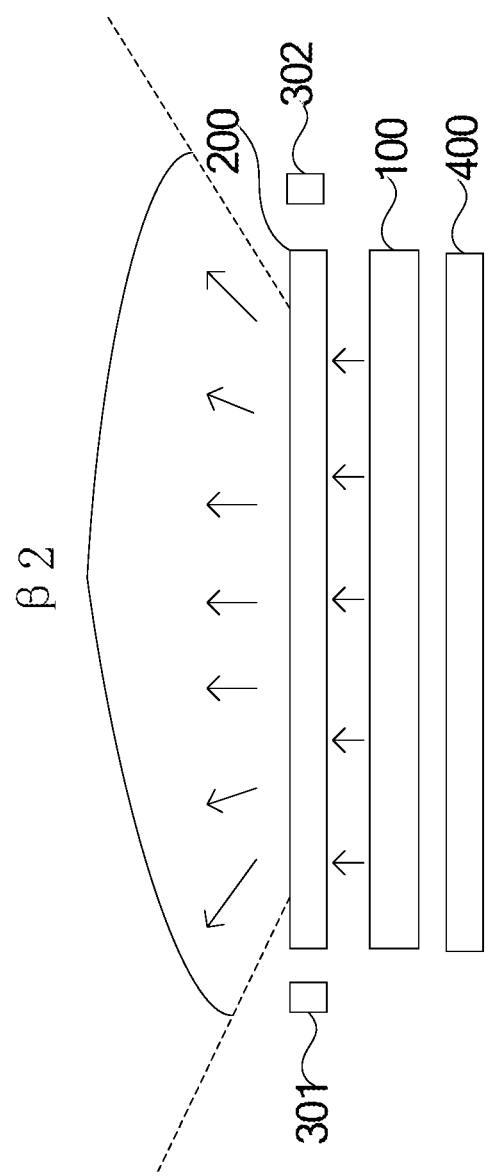
FIG. 6 is a schematic diagram of the display apparatus as shown in FIG. 5 when the first light source and the second light source are turned off.

If the first light source 301 and the second light source 302 are both turned off at the same time, as shown in FIG. 6, the transparent substrate 200 does not substantially influence the light from the display panel 100, and both the front viewer and the side viewer can normally see the light from, and thus the images displayed by, the display panel 100. As such, the viewing range of the display apparatus is substantially β2.

Therefore, by turning on or off the first light source 301 and the second light source 302, the viewing range of the display apparatus can be switched.

In the embodiment of the display apparatus as described above, the plurality of dots 202 in the second edge region of the transparent substrate 200 that is apart from the second side surface 201b can have a variety of arrangements, such as being aligned in columns, which can be selected depending on practical needs. There are no limitations herein.

If the plurality of dots 202 in the second edge region of the transparent substrate 200 that is apart from the second side surface 201b are aligned in columns, there are multiple arrangement to realize that in the second edge region apart from the second side surface 201b, dots 202 that are closer to the side opposing to the second side surface 201b (i.e. the first side surface 201a) have a higher density.

Such an arrangement allows as much light from the second light source 302 as possible to emit from the second edge region of the transparent substrate 200 that is apart from the second side surface 201b, which can reduce the influence of the light from the second light source 302 on the front viewers.

In a third arrangement, as for any two neighboring columns of dots 202 in the second edge region of the transparent substrate 200 that is apart from the second side surface 201b, the column that is farther apart from the second light source 302 contains a larger number of dots 202 than the column that is closer to the second light source 302.

By controlling the number of dots in each column to thereby control the density of the dots, this embodiment of the display apparatus as described above has advantages such as simple fabrication and easy control over the density of the dots.

In this arrangement, by arranging that the closer a column is to the first side surface 201a, the larger the number of dots 202 it contains, the dots 202 that are closer to the first side surface 201a are thus configured to have a higher density. This in turn causes as much light from the first light source 301 as possible can emit from the second edge region of the transparent substrate 200 that is apart from the second side surface 201b.

In a fourth arrangement, as for any three neighboring columns of dots in the second edge region of the transparent substrate 200 that is apart from the second side surface 201b, the distance between the middle column and the column that is farther apart from the second light source 302 is smaller than the distance between the middle column and the column that is closer to the second light source 302.

By controlling the distances between columns to thereby control the density of the dots, this embodiment of the display apparatus as described above has advantages such as simple fabrication and easy control over the density of the dots.

In this embodiment, by arranging that the closer the columns of dots are to the first side surface 201a, the smaller the distance between columns, the dots 202 that are closer to the first side surface 201a are thus configured to have a higher density. This in turn causes as much light from the first light source 301 as possible can emit from the second edge region of the transparent substrate 200 that is apart from the second side surface 201b.

Figure 7:
FIG. 7 is a schematic diagram of an arrangement of the dots in the transparent substrate of the display apparatus as shown in FIG. 5 according to some embodiment of the present disclosure.

In practice, the third arrangement and the fourth arrangement as described above can be applied at the same time to thereby configure that the dots 202 that are closer to the first side surface 201a have a higher density, as illustrated in FIG. 7.

In order to ensure a consistent brightness along an extending direction of the second side surface 201b in the second edge region of the transparent substrate 200 that is apart from the second side surface 201b, it can be configured such that the dots 202 in each column in the second edge region have a substantially identical distance between every two neighboring dots 202.

The following is noted. Besides the third arrangement and the fourth arrangement as described above which are both based on a manner of arrangement having the dots 202 aligned in columns, there are other manners of arrangement whereby the dots 202 that are closer to the first side surface 201a have a higher density.

As a general manner of arrangement to this purpose, the second edge region of the transparent substrate 200 that is apart from the second side surface 201b can be configured to comprise a plurality of strip sub-regions, each having a same extending direction as the second side surface 201b. As for every two neighboring strip sub-regions (i.e. a first strip sub-region and a second strip sub-region), the first strip sub-region farther apart from the second light source 302 is configured to contain a larger number of dots 202 than the second strip sub-region that is closer to the second light source 302.

It is noted that because the lower surface of the transparent substrate 200 is not provided with any optical films, the large amount of light from the first light source 301 and/or the second light source 302 does not emit from the center region on the upper surface of the transparent substrate 200, but rather emits out in the edge regions and from the side surfaces under the action of the plurality of dots 202 to thereby enter into the eyes of the side viewer.

A majority of the light from the first light source 301 or the second light source 302 enters into the eyes of the side viewer, but not into the eyes of the front viewer.

As such, as for a side viewer, the brightness in the edge regions (including the first edge region and the second edge region) is much higher than that of the images displayed in the display panel 100, which can reach up to tens of thousands of nits, causing people to feel dazzling and thus unable to clearly see the images displayed by the display panel.

Yet as for a front viewer, because only a small amount of light emitting out from the edge regions (including the first edge region and the second edge region) enters into the eyes of the front viewer, the brightness in the edge regions is higher than that of the images displayed in the display panel 100.

However, because there is only a small amount of light from the first light source 301 or the second light source 302 entering into the eyes of the front viewer, the brightness in the edge regions seen by the front viewer is much lower than the brightness in the edge regions seen by the side viewer.

Figure 8:
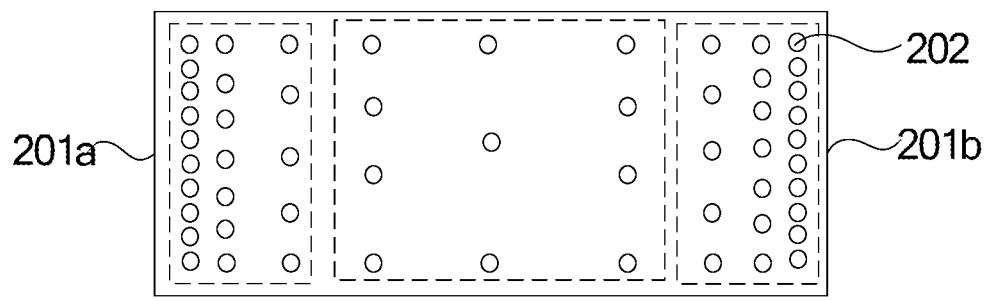
FIG. 8 is a schematic diagram of an arrangement of the dots in the transparent substrate of the display apparatus as shown in FIG. 5 according to another embodiment of the present disclosure.

In order to balance the different brightness in different regions of the display apparatus seen by the front viewer, a center region of the transparent substrate, which is between the first edge region apart from the first side surface 201a and the second edge region apart from the second side surface 201b, can be provided with a plurality of dots 202, similarly arranged in an interior of the transparent substrate 200, or on a surface of the transparent substrate 200 facing to the display surface of the display panel 100, as illustrated in FIG. 8. The arrangement of the plurality of dots 202 in the center region as described above can increase the brightness in the center region.

However, in order to make sure that as much light as possible from the first light source 301 or the second light source 302 can emit out from the edge regions (including the first edge region and the second edge region), the dots 202 in the edge regions can be configured to have a higher density than the dots 202 in the center region.

In FIG. 8, the box encircled with a dotted line on a left side indicates the second edge region of the transparent substrate 200 that is apart from the second side surface 201b; the box encircled with a dotted line on a right side indicates the first edge region of the transparent substrate 200 that is apart from the first side surface 201a; and the box encircled with a dotted line in the middle indicates the center region.

In the display apparatus as described above, the plurality of dots 202 in the center region of the transparent substrate 200 can have a variety of arrangements, such as being aligned in columns, which can be selected depending on practical needs. There are no limitations herein.

In practice, it should be configured such that the brightness in the center region can be increased while as much light as possible can emit out from the edge regions.

As such, under a situation that the dots in the center region of the transparent substrate 200 are aligned in columns, a variety of arrangements can be applied such that a sub-region in the center region closer to any edge region (i.e. farther apart from the center of the transparent substrate 200) contains dots of a higher density than another region in the center region farther apart from any edge region (i.e. closer to the center of the transparent substrate 200). Thereby as much light as possible can emit out from the edge regions.

In a fifth arrangement, as for any two neighboring columns of dots 202 in the center region of the transparent substrate 200, the column that is farther apart from the center of the center region contains a larger number of dots 202 than the column that is closer to the center of the center region.

By controlling the number of dots in each column to thereby control the density of the dots, this embodiment of the display apparatus as described above has advantages such as simple fabrication and easy control over the density of the dots.

In a sixth arrangement, the distance between columns of dots 202 in the center region of the transparent substrate 200 can be altered to thereby change the density of dots 202. It can be configured such that the closer the columns are to the center of the center region, the larger the distance between columns, and vice versa.

In order to ensure a consistent brightness in each part of the center region of the transparent substrate 200, it can be configured such that the dots 202 in each column in the center region have a substantially identical distance between every two neighboring dots 202.

The following is noted. Besides the fifth arrangement and the sixth arrangement as described above which are both based on a manner of arrangement having the dots 202 aligned in columns, there are other manners of arrangement whereby the dots 202 that are closer to the center of the center region of the transparent substrate 200 have a lower density.

As a general manner of arrangement to this purpose, the center region of the transparent substrate 200 can be configured to comprise a plurality of strip sub-regions, each having a same extending direction as the first side surface 201a (or the second side surface 201b). As for every two neighboring strip sub-regions (i.e. a first strip sub-region and a second strip sub-region), the first strip sub-region farther apart from the center of the center region is configured to contain a larger number of dots 202 than the second strip sub-region that is closer to the center of the center region.

Figure 9:
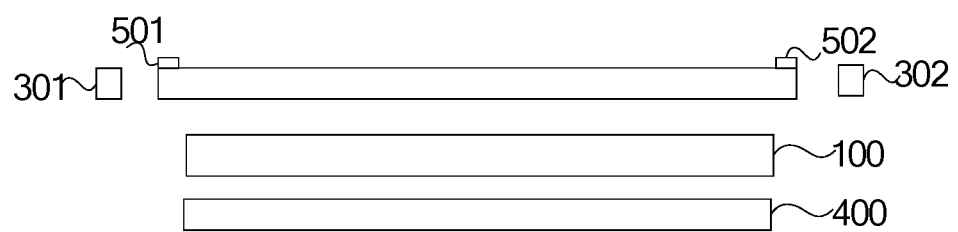
FIG. 9 is a schematic diagram of a display apparatus according to yet some other embodiments of the present disclosure.

In order to avoid that the relatively higher brightness in the edge regions causes visual fatigue to the front viewers, as illustrated in FIG. 9, a length of the transparent substrate 200 can be increased (i.e. a first length of the transparent substrate 200 in a direction perpendicular to the first side surface 201a is configured to be longer than a second length of the display panel 100 in the direction perpendicular to the first side surface 201a).

Specifically as shown in FIG. 9, for each of the two light sources 301 and 302, a corresponding side surface of the transparent substrate is configured to have a shorter distance to the each light source than an orthographic projection of a sideline of the viewing surface closest to the each light source on the transparent substrate.

Accompanying this above configuration, a first shading portion 501 and/or a second shading portion 502 can be further disposed in the viewing angle control device. The first shading portion 501 is disposed to cover the first side 201a, and the second shading portion 502 is disposed to cover the second side 201b, configured such that over-bright sub-regions in the edge regions (including the first edge region and the second edge region) can be shaded by the first shading portion 501 and the second shading portion 502.

Because the light from the first light source 301 and/or the second light source 302 primarily emits out from the edge regions and not only from the side surfaces, the anti-peeping feature of the display apparatus is thus not affected.

Depending on different embodiments of the present disclosure, each of the first light source 301 and the second light source 302 can be a side-emitting light source, and can be an LED lamp, a fluorescent lamp, or a light source of other types. Selection of the light source for the first light source 301 and the second light source 302 can rely on different practical needs, and there are no limitations herein.

In the various embodiments of the display apparatus as described above, the transparent substrate 200 is disposed over the display side of the display panel 100. In order to minimize the influence on the display effect, the plurality of dots 202 can be fabricated in a high-definition pattern of dots.

For example, the size of the dots 202 can be in a range of microns to nanometers. The plurality of dots 202 having a size as such are substantially invisible to naked eyes in the dark state, thereby the light from the display panel 100 is not substantially influenced when it passes through the transparent substrate 200.

Depending on different embodiments, the pattern of dots can be formed via a processing technology such as inkjet, laser, etching, or nano-imprinting. For example, a laser processing technology can be employed such that the plurality of dots 202 can be formed in the interior of the transparent substrate 200, whereas an etching process can be employed such that the plurality of dots 202 can be formed on a surface of the transparent substrate 200 facing to the display surface of the display panel 100.

Selection of the processing technologies for the formation of the plurality of dots 202 as mentioned above shall be based on practical needs, and there are no limitations herein.

Figure 10:
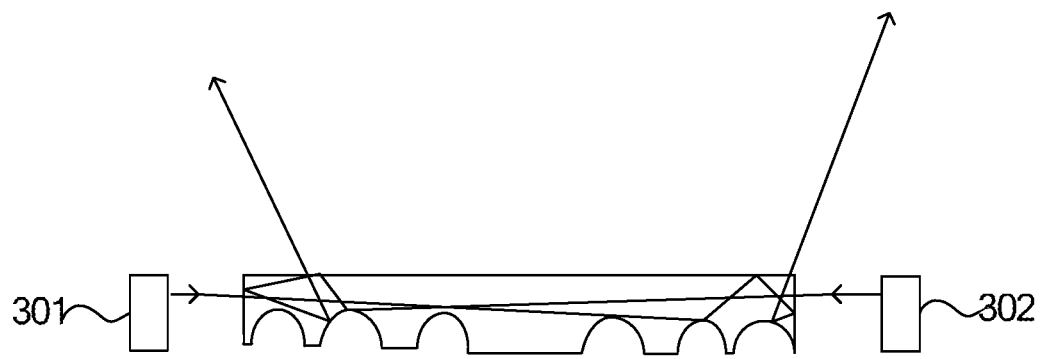
FIG. 10 is a light path diagram of a display apparatus where the plurality of dots are arranged on a surface of the transparent substrate facing to a display surface of the display panel.

It is of note that although the plurality of dots 202 shown in FIG. 1 and FIG. 5 are arranged in the interior of the transparent substrate 200, it is not limiting, and the plurality of dots can as well be arranged on a lower surface of the transparent substrate 200, i.e. on a surface of the transparent substrate 200 facing to the display surface of the display panel 100, illustrated in FIG. 10.

As shown in FIG. 10, the plurality of dots 202 are arranged on the lower surface of the transparent substrate 200. As such, the light from the first light source 301 and the second light source 302 which are disposed at two sides of the transparent substrate 200 respectively can be scattered in the interior of the transparent substrate 200 before emitting out from the edge regions (including the first edge region and the second edge region) or the side surfaces.

Figure 11:
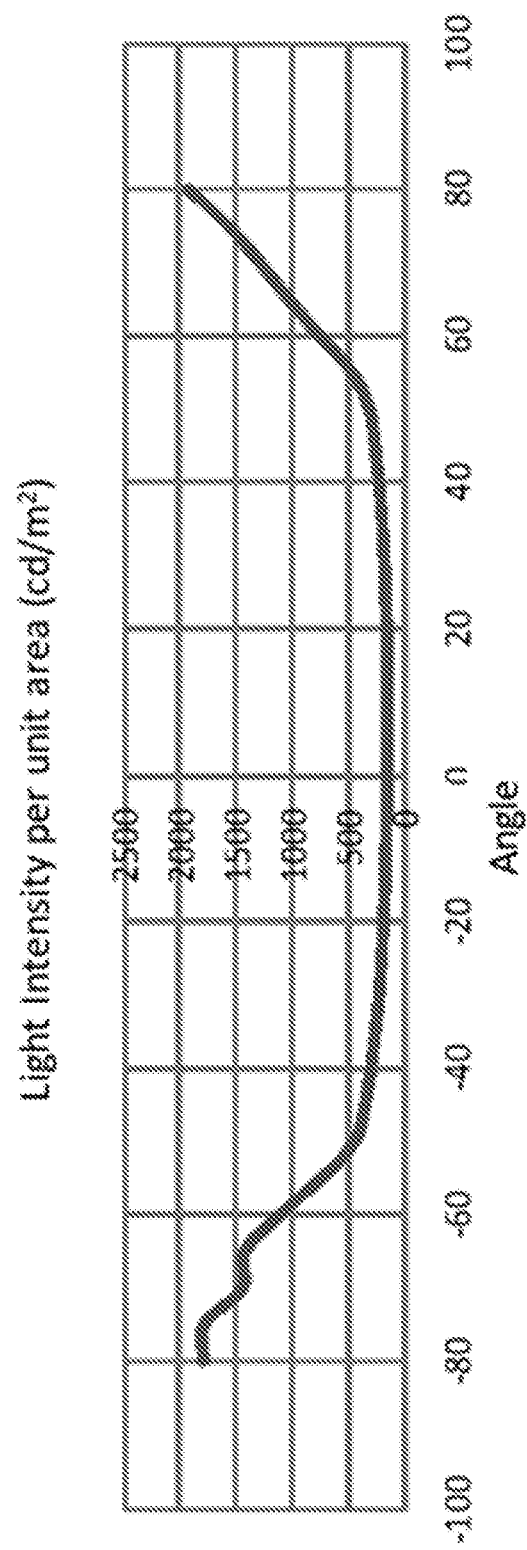
FIG. 11 shows an experimental result measuring the intensity of emitting light from the first light source 301 or the second light source 302 within different ranges of angles.

FIG. 11 shows an experimental result testing the intensity of emitting light from the first light source 301 or the second light source 302 within different ranges of angles. As shown in FIG. 11, the light emitted from any of the edge regions in the transparent substrate 200 has a relatively higher intensity within a range of 60-80°.

Because a sider viewer typically see the images displayed by the display panel 100 within the same range of angles, the display apparatus disclosed herein can thus effectively play an anti-peeping function. In FIG. 11, it should be noted that the angle of a direction that is perpendicular to the transparent substrate 200 is set as 0°.

In another aspect, the present disclosure provides a method for controlling a viewing angle of the display apparatus according to any of the embodiments as described above.

According to some embodiments, the method comprises the steps of:

turning on the first light source 301 to thereby switch into a first viewing angle mode; and turning off the first light source 301 to thereby switch into a second viewing angle mode.

Herein a first viewing angle range associated with the first viewing angle mode is configured to be smaller than a second viewing angle range associated with the second viewing angle mode.

If a viewing angle of the display apparatus is within the first viewing angle range, only a front viewer and a first sider viewer on the side of the first side surface 201a can see images displayed by the display panel, whereas a second side viewer on the side of the second side surface 201b cannot see the images displayed by the display panel.

If a viewing angle of the display apparatus is with the second viewing angle range, the front viewer, the first sider viewer on the side of the first side surface 201a, and the second side viewer on the side of the second side surface 201b can all see the images displayed by the display panel.

The method as described above substantially realizes a switch from the first viewing angle mode to the second viewing angle mode. It is noted that it is possible to realize a switch from the second viewing angle mode to the first viewing angle mode according to some other embodiments.

Specifically in these embodiments, the method includes the following steps:

turning off the first light source 301 to thereby switch into the second viewing angle mode; and turning on the first light source 301 to thereby switch into the first viewing angle mode.

As such, as for the second side viewer on the side of the second side surface 201b, by turning on or off the first light source 301, the display apparatus can switch between an anti-peeping mode and a non-anti-peeping mode.

According to some embodiments of the present disclosure, the display apparatus includes a second light source 302 in addition to the first light source 301, and the method can include the steps of:

turning on the second light source 302 to thereby switch into a third viewing angle mode; and turning off the second light source 302 to thereby switch into a fourth viewing angle mode.

Herein a third viewing angle range associated with the third viewing angle mode is configured to be smaller than a fourth viewing angle range associated with the fourth viewing angle mode.

If a viewing angle of the display apparatus is within the third viewing angle range, only a front viewer can see the images displayed by the display panel, whereas and the first sider viewer on the side of the first side surface 201a, and the second side viewer on the side of the second side surface 201b cannot see the images displayed by the display panel.

If a viewing angle of the display apparatus is with the fourth viewing angle range, the front viewer, the first sider viewer on the side of the first side surface 201a, and the second side viewer on the side of the second side surface 201b can all see the images displayed by the display panel. Herein the fourth viewing angle range is substantially identical to the second viewing angle range.

The method as described above substantially realizes a switch from the third viewing angle mode to the fourth viewing angle mode. It is noted that it is possible to realize a switch from the fourth viewing angle mode to the third viewing angle mode according to some other embodiments.

Specifically in these embodiments, the method includes the following steps:

turning off the first light source 301 to thereby switch into the fourth viewing angle mode; and turning on the first light source 301 to thereby switch into the third viewing angle mode.

As such, the second light source 302 can be independently turned on or off to control the viewing angle of the display apparatus. In other words, if the second light source 302 is turned on, the first side viewer on the side of the first side surface 201a cannot see the images displayed by the display panel; whereas if the second light source 302 is turned off, the first side viewer on the side of the first side surface 201a can see the images displayed by the display panel. As such, the viewing angle can be switched.

It is noted that the front viewing angle as mentioned in the present disclosure is referred to as an angle whereby a front viewer sees the display panel, and the side viewing angle as mentioned in the present disclosure is referred to as an angle whereby a sider viewer sees the display panel.

It is further noted that in the embodiments where the display apparatus includes both a first light source and a second light source, the first light source and the second light source can be independent from each other.

All references cited in the present disclosure are incorporated by reference in their entirety. Although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the exemplary embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A display apparatus, comprising:
   a viewing angle control device;
   a backlight; and
   a display panel disposed between the viewing angle control device and the backlight supplying a back light to the display panel, and having a viewing surface as a front display surface of the display panel;
   wherein:

the viewing angle control device controls a viewing angle over the viewing surface;

the viewing angle control device comprises a transparent substrate disposed over and covering the viewing surface, and at least one light source each facing a side surface of the transparent substrate and configured to emit a light into the transparent substrate from the side surface of the transparent substrate upon being turned on;

the transparent substrate is provided with a plurality of dots, configured to scatter the light from each of the at least one light source such that the viewing angle over the viewing surface is switched by turning on or off the each of the at least one light source;

the at least one light source comprises two light sources, respectively disposed over two opposing side surfaces of the transparent substrate;

for each light source of the two light sources, a corresponding side surface of the transparent substrate facing the each light source is configured to have a shorter distance to the each light source than an orthographic projection of a sideline of the viewing surface closest to the each light source on the transparent substrate;

the viewing angle control device further comprises two flat light shading films without covering the at least one light source; and each of the two flat light shading films, respectively corresponding to the each light source, is disposed directly on an edge of a light-exiting surface of the transparent substrate opposing to the viewing surface, and in a region between the corresponding side surface of the transparent substrate and the orthographic projection of the sideline of the viewing surface closest to the each light source on the transparent substrate, and is configured to block scattered light emitted from the region.

2. The display apparatus of claim 1, wherein the transparent substrate comprises at least one first region, wherein:

each first region corresponds to, and is at a side opposing to a side surface of, one light source, wherein:

a first subset of the plurality of dots are arranged in the each first region, and are configured to scatter a light from the one light source such that a scattered light predominantly emits out from the each first region to thereby interfere with side viewing from the side opposing to the side surface of the one light source.

3. The display apparatus of claim 2, wherein each of the first subset of the plurality of dots in the each first region is disposed in an interior of the transparent substrate.

4. The display apparatus of claim 2, wherein each of the first subset of the plurality of dots in the each first region is disposed on a first surface of the transparent substrate facing to the viewing surface.

5. The display apparatus of claim 2, wherein the each first region comprises a plurality of sub-regions, arranged in parallel strips and each having a substantially same extending direction as the corresponding side surface, wherein:

the plurality of sub-regions are configured such that a first sub-region contains a higher density of dots than a second sub-region closer to the one light source.

6. The display apparatus of claim 2, wherein the first subset of the plurality of dots in the each first region are aligned in columns, each having a substantially same extending direction as the corresponding side surface.

7. The display apparatus of claim 6, wherein the first subset of the plurality of dots in the each first region are configured such that a first column contains a larger number of dots than a second column closer to the one light source.

8. The display apparatus of claim 6, wherein the first subset of the plurality of dots are configured such that:

each column of dots contain an equal number of dots; and a distance between every two adjacent columns of dots reduces with an increasing distance of a center line therebetween from the corresponding side surface.

9. The display apparatus of claim 6, wherein the first subset of the plurality of dots are configured such that each column of dots have a substantially identical distance.

10. The display apparatus of claim 2, wherein the transparent substrate further comprises a second region, surrounded by the at least one first region, wherein:

a second subset of the plurality of dots are arranged in the second region, and are configured to have a lower density than the first subset of the plurality of dots in the each first region.

11. The display apparatus of claim 1, wherein the transparent substrate has a composition of a glass, or a polymer plastic.

12. The display apparatus of claim 11, wherein the transparent substrate has a composition of a polymer plastic, selected from acrylic or polycarbonate.

13. The display apparatus of claim 1, wherein each of the plurality of dots is configured to have a size in a range of microns to nanometers.

14. The display apparatus of claim 1, wherein the at least one light source is configured to be independent from one another.

15. The display apparatus according to claim 1, wherein:

the display panel is in a shape of a rectangle.

* * * * *